US008706077B2

(12) United States Patent
Zhu et al.

(10) Patent No.: US 8,706,077 B2
(45) Date of Patent: Apr. 22, 2014

(54) CONFIGURABLE COMMON REFERENCE SIGNAL PORT FOR REFERENCE SIGNAL RECEIVED POWER IN DISTRIBUTED ANTENNA SYSTEMS

(75) Inventors: Yuan Zhu, Beijing (CN); Sassan Ahmadi, Portland, OR (US); Xiangying Yang, Portland, OR (US); Yujian Zhang, Beijing (CN); Kamran Etemad, Potomac, MD (US); Xiaogang Chen, Beijing (CN)

(73) Assignee: Intel Corporation, Santa Clara, CA (US)

( * ) Notice: Subject to any disclaimer, the term of this patent is extended or adjusted under 35 U.S.C. 154(b) by 524 days.

(21) Appl. No.: 12/928,758

(22) Filed: Dec. 17, 2010

(65) Prior Publication Data

US 2012/0038521 A1    Feb. 16, 2012

Related U.S. Application Data

(60) Provisional application No. 61/373,788, filed on Aug. 13, 2010.

(51) Int. Cl.
*H04W 88/02* (2009.01)

(52) U.S. Cl.
USPC ...................................... 455/404.2

(58) Field of Classification Search
CPC ............... H04W 4/00–4/22; H04W 8/085; H04W 8/22; H04W 28/0221; H04W 28/0226; H04W 16/08
USPC ........ 455/404.2, 39, 423, 522, 436–444, 425; 370/328; 343/703

See application file for complete search history.

(56) References Cited

U.S. PATENT DOCUMENTS

| 2006/0009177 | A1 | 1/2006 | Persico et al. |
| 2010/0067514 | A1 | 3/2010 | Luo et al. |
| 2011/0105144 | A1* | 5/2011 | Siomina et al. ............ 455/456.1 |
| 2012/0287875 | A1* | 11/2012 | Kim et al. ..................... 370/329 |
| 2013/0023285 | A1* | 1/2013 | Markhovsky et al. ..... 455/456.1 |

FOREIGN PATENT DOCUMENTS

| WO | 2012/021274 A2 | 2/2012 |
| WO | 2012/021274 A3 | 4/2012 |

OTHER PUBLICATIONS

International Search Report and Written Opinion received for PCT Patent Application No. PCT/US2011/044785, mailed on Feb. 17, 2012, 10 Pages.

* cited by examiner

*Primary Examiner* — Diane Mizrahi
(74) *Attorney, Agent, or Firm* — Kacvinsky Daisak Bluni PLLC

(57) ABSTRACT

A method of determining reference signal received power (RSRP) by user equipment (UE) associated with a distributed antenna system (DAS) may include detecting at least three different reference signals in one or more common reference signals (CRSs) that are associated with different antennas in the DAS. The method may also include determining at least three different RSRPs corresponding to the at least three different reference signals. The at least three different RSRPs may be level 3 filtered to produce at least three corresponding filtered powers. The UE may report a maximum of the at least three corresponding filtered powers to the distributed antenna system.

9 Claims, 4 Drawing Sheets

CONFIGURABLE COMMON REFERENCE SIGNAL PORT FOR REFERENCE SIGNAL RECEIVED POWER IN DISTRIBUTED ANTENNA SYSTEMS

CROSS-REFERENCE TO RELATED APPLICATIONS

The present application claims the benefit of U.S. provisional application Ser. No. 61/373,788, filed Aug. 13, 2010, the entire content of which is incorporated by reference herein.

BACKGROUND

Implementations of the claimed invention generally may relate to wireless communication, and in particular to signal measurements in distributed antenna systems.

FIG. 1 conceptually illustrates a centralized antenna system (CAS) 100 and a distributed antenna system (DAS) 120. CAS 100 may include enhanced node B (eNB) 110, which may be referred to in other contexts as a base station. eNB 110 may include a number of antennas that are physically collocated with the node. In this sense the antenna(s) are centralized with respect to eNB 110.

In DAS 120, multiple antennas 140-0, 140-1, etc. (collectively "antennas 140) for one eNB 130 may be located physically far apart from each other. Unlike CAS 100, the cells associated with antennas 140 may not overlap completely. For example, the cell associated with antenna 140-0 may cover a substantial area that the call associated with antenna 140-2 does not, and vice versa. Antennas 140 may be connected to eNB 130 through, for example, optical fiber that may minimize the transmission delay from eNB 130 to/from the remote antennas 140. FIG. 1 shows one exemplary DAS 120 in which eNB 130 has four remote antennas 140, although the technique herein is not limited in this regard.

Due to the distributed, physically remote nature of antennas 140 in DAS 120 some issues in signal measurement may arise.

BRIEF DESCRIPTION OF THE DRAWINGS

The accompanying drawings, which are incorporated in and constitute a part of this specification, illustrate one or more implementations consistent with the principles of the invention and, together with the description, explain such implementations. The drawings are not necessarily to scale, the emphasis instead being placed upon illustrating the principles of the invention. In the drawings, FIG. 1 conceptually illustrates a centralized antenna system and a distributed antenna system.

DETAILED DESCRIPTION

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of the claimed invention. However, it will be apparent to those skilled in the art having the benefit of the present disclosure that the various aspects of the invention claimed may be practiced in other examples that depart from these specific details. In certain instances, descriptions of well known devices, circuits, and methods are omitted so as not to obscure the description of the present invention with unnecessary detail.

In 3GPP Long Term Evolution (LTE) Releases 8 and/or 9, a common reference signal (CRS) serves many roles for the downlink. For example user equipment (UE) may use the CRS for downlink link adaptation, data demodulation, reference signal received power (RSRP) measurements for handover, etc.

Figure 2:
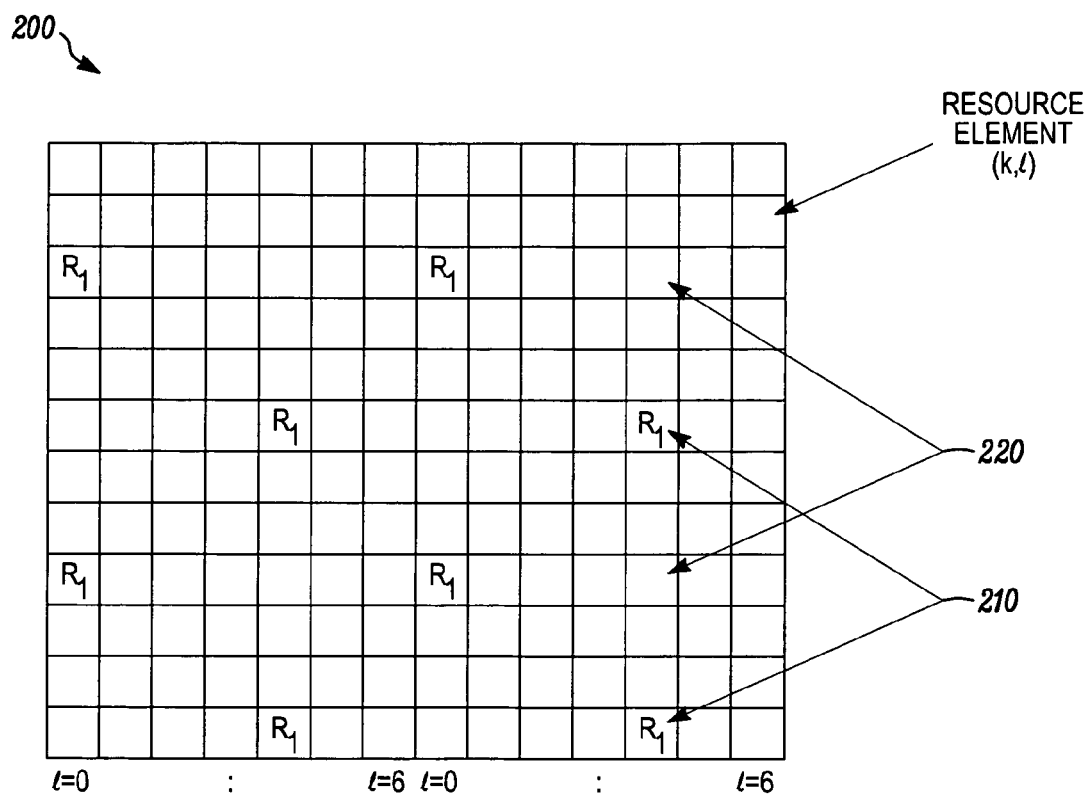
FIG. 2 shows the common reference signal pattern for a long term evolution sub frame.

FIG. 2 shows a CRS pattern for an LTE sub frame with a normal control plane (CP). A maximum of four CRS ports can exist for a LTE sub frame. There exists some freedom for the eNB to map one physical antenna with one CRS port. One straightforward mapping method is to map one physical antenna with one CRS port. For a given antenna port, for example, some reference symbols 210 may be used while other reference symbols 220 may not be used.

Reference signal received power (RSRP) is defined in LTE Rel-8/9 as an average receiving power for CRS port 0. In particular, RSRP may be defined as the linear average over the power contributions of the resource elements that carry cell-specific reference signals within the considered measurement frequency bandwidth. If UE is able to reliably detect the existence of CRS port 1, it may also use the average receiving power for CRS port 1 to improve the RSRP measurement accuracy. So even there are four CRS ports for a given eNB, a conventional UE may only measure RSRP from the CRS port 0 or CRS ports 0/1.

Figure 1:
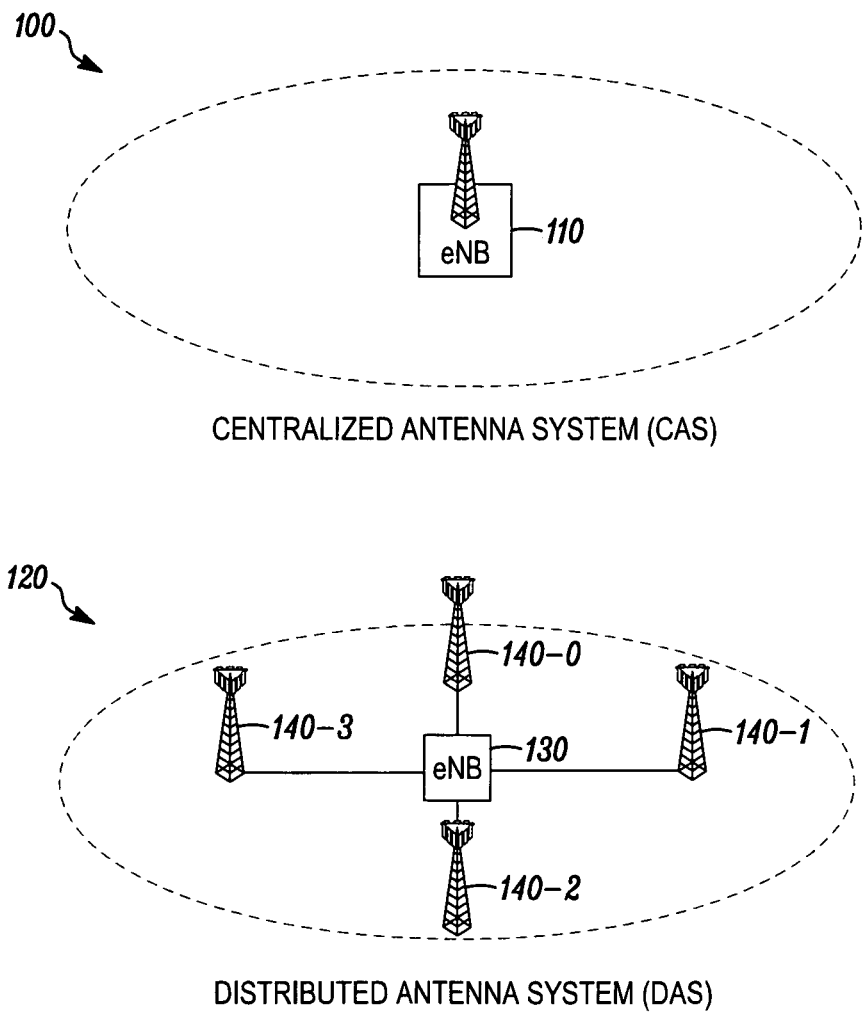

When a UE is in RRC_CONNECTED mode, a corresponding eNB will mainly rely on the RSRP report from UE to make a decision whether to handover the UE to another eNB. Such conventional RSRP measurement implicitly involves and assumes a centralized antenna system (CAS) as conceptually illustrated in FIG. 1. Thus for a CAS the average receiving power of CRS 0/1 may be viewed as representative of all the CRS ports that a given eNB has. Such a common CRS value or values is due to the centralized or collocated arrangement of antennas in a CAS.

In DAS systems, by contrast, this assumption of common or similar CRS values may not hold or be valid. Because of the physical location difference for different antennas, the mechanical antenna gain/shadowing/pathloss may be different from different antennas of the same eNB to the same UE. In such case the RSRP from different CRS ports of the same eNB may have large differences.

For example, if a UE is still using CRS 0 or CRS 0/1 to measure RSRP and its associated eNB is basing its handover decision based on this report, there may be mis-estimation of one eNB's coverage. Such imperfect RSRP information may result in a suboptimally triggered handover.

Figure 3:
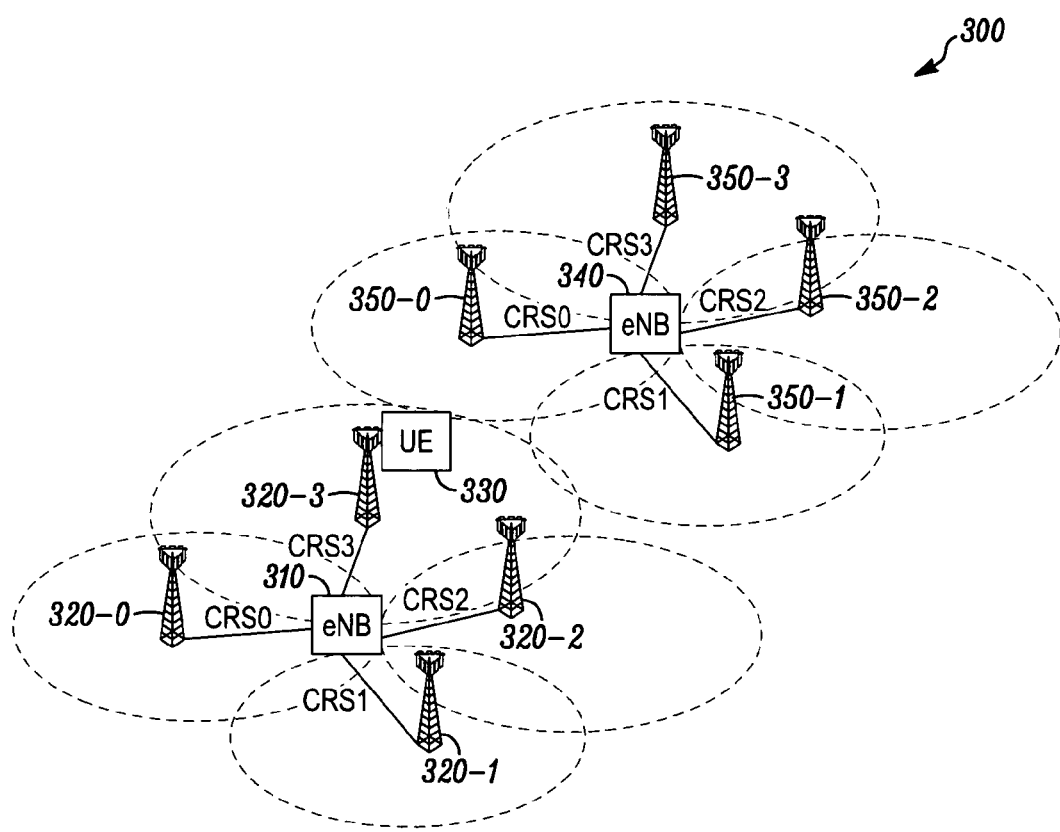
FIG. 3 illustrates two distributed antenna systems whose four CRS ports are different and partially overlap.

FIG. 3 illustrates two distributed antenna systems 300 whose four CRS ports are different and partially overlap. The first DAS includes eNB 310 and antennas 320-0 to 320-3 (collectively "antennas 320"). The second DAS includes eNB 340 and antennas 350-0 to 350-3 (collectively "antennas 350").

If UE 330, for example, only relies on measured power from CRS 0 (the CRS signal associated with the $0^{th}$ antennas) to measure RSRP, when UE 330 moves to the coverage area of antenna 320-3 of eNB 310 it might be handed over to neighbor eNB 340 because the RSRP from antenna 350-0 of eNB 340 may be better than the competing RSRP from antenna 320-0. In practice, however, UE 330 should stay with eNB 310 and get served by antenna 320-3 of eNB 310 due to its presence within this antenna's coverage area and stronger RSRP from antenna 320-3.

Such potential suboptimal handover from eNB 310 to eNB 320 may be avoided as follows. Instead of statically setting the RSRP measurement from CRS 0 or CRS 0/1, eNB can configure UE 330 to measure RSRP on different CRS ports.

Figure 4:
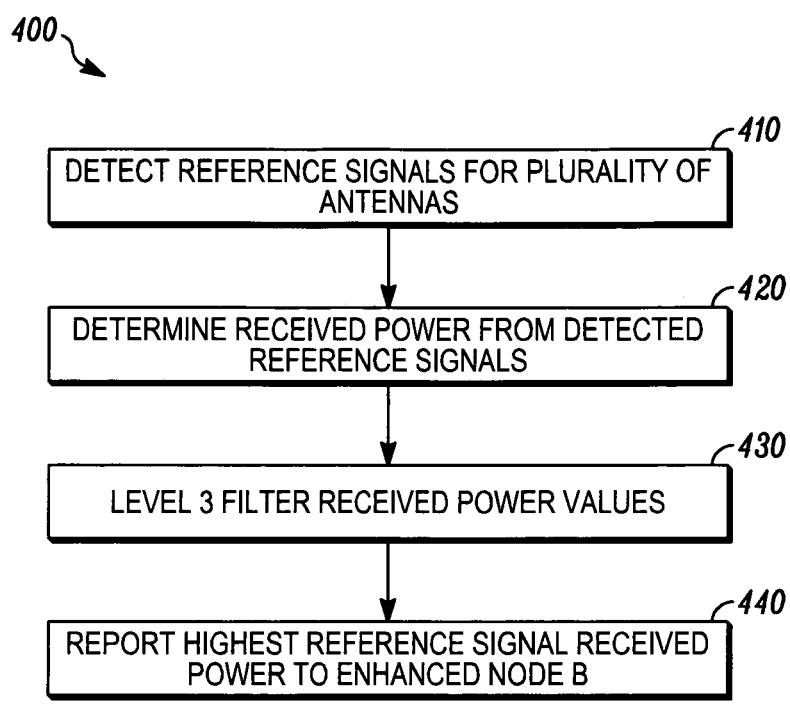
FIG. 4 shows one exemplary method to implement CRS port-specific RSRP measurements.

FIG. 4 shows one exemplary method 400 for a user equipment (UE) to implement CRS port-specific RSRP measurements. Although not limiting in this respect, for ease of illustration method 400 may be discussed at times in the context of UE 330 and eNB 310 in FIG. 3. One implementation of method 400 may be to change the RSRP definition in 3GPP LTE future releases of TS 36.214 similar to the description below and trigger the measurement reports from the best RSRP value of all CRS ports of one eNB.

In act 410, UE 330 may determine RSRP values using as many of the cell-specific reference signals $R_0$, $R_1$, $R_2$, and $R_3$ as are available. Such reference signals may be included in CRS signals as explained in, for example, 3GPP TS 36.211. If UE 330 can reliably detect that $R_1$ $R_2$ and $R_3$ are available it may use $R_1$ $R_2$ and $R_3$ in addition to $R_0$ to determine RSRP.

In act 420, when more than one cell-specific signal is used to determine RSRP, UE 330 may measure the RSRP for each cell-specific reference signal separately and provide one RSRP measurement for each cell-specific reference signal R0, R1, R2, and R3 to upper layer processing.

Section 5.5.3 of 3GPP TS 36.331 directs that UEs perform layer 3 filtering of measurements (e.g., RSRP) when the UE performs such measurements. Accordingly, in act 430 UE 330 may perform layer 3 filtering separately for each RSRP value that was generated from each cell-specific reference signal in act 420.

In act 440, UE 330 may report the highest of the filtered RSRP values to eNB 310. Such reporting may, in some implementations, be in response to a request from eNB 310. If eNB 310 is using reference signal received quality (RSRQ) based handover, it may use the reported RSRP value from UE 330 to make a handover decision.

Although method 400 has the advantage that no additional signaling is needed over the air relative to the conventional scheme of using $R_0/R_1$, it does cause UEs to implement RSRP measurements for each CRS port separately. These additional measurements may be made even if eNB 310, for example, operates in CAS mode.

To alleviate this measurement burden in some implementations, a new RSRP measurement mode may be introduced in addition to the legacy RSRP measurement mode. The new RSRP measurement mode would function in accordance with method 400, and selection between these two modes may be based on eNB signaling and/or UE capability. eNB signaling, for example, might be added to some system information block (SIB) to be broadcast in the cell. Under such a mode switching scheme, when eNB 310 is working in DAS and UE 330 also supports this advanced RSRP measurement mode UE 330 will work in this mode. Otherwise UE 330 may still operate in the legacy RSRP measurement mode using just $R_0$ or $R_0/R_1$.

Thus, under the scheme as described herein a UE may use CRS based RSRP measurements and layer 3 filtering to produce the best RSRP for all CRS ports of a DAS eNB. Such best RSRP may be used for event evaluation by eNBs, such as handover decisions.

The foregoing description of one or more implementations provides illustration and description, but is not intended to be exhaustive or to limit the scope of the invention to the precise form disclosed. For example, although not explicitly shown, either the UE or eNB may contain a processor or logic configured to perform its portion of the method(s) described herein. Modifications and variations are possible in light of the above teachings or may be acquired from practice of various implementations of the invention.

No element, act, or instruction used in the description of the present application should be construed as critical or essential to the invention unless explicitly described as such. Also, as used herein, the article "a" is intended to include one or more items. Variations and modifications may be made to the above-described implementation(s) of the claimed invention without departing substantially from the spirit and principles of the invention. All such modifications and variations are intended to be included herein within the scope of this disclosure and protected by the following claims.

What is claimed:

1. A method of determining reference signal received power by user equipment associated with a distributed antenna system, comprising:
    detecting four reference signals from the distributed antenna system corresponding to four antennas in the distributed antenna system;
    determining four reference signal received powers corresponding to the four reference signals; and
    reporting a value corresponding to a highest one of the four reference signal received powers to the distributed antenna system.

2. The method of claim 1, wherein the value reported in the reporting corresponds to a highest one of the four reference signal received powers.

3. The method of claim 1, further comprising:
    filtering the four reference signal received powers to produce four filtered powers, wherein the value reported in the reporting is a highest one of the four filtered powers.

4. A method of determining reference signal received power (RSRP) by user equipment (UE) associated with a distributed antenna system (DAS), comprising:
    detecting at least three different reference signals in one or more common reference signals (CRSs) that are associated with different antennas in the DAS;
    determining at least three different RSRPs corresponding to the at least three different reference signals;
    level 3 filtering at least three different RSRPs to produce at least three corresponding filtered powers; and
    reporting a maximum of the at least three corresponding filtered powers by the UE to the distributed antenna system.

5. The method of claim 4, wherein the detecting detects four reference signals corresponding to four different antennas in the distributed antenna system.

6. The method of claim 5, wherein the determining determines four RSRPs corresponding to the four reference signals.

7. The method of claim 6, wherein the level 3 filtering produces four corresponding filtered powers.

8. The method of claim 4, wherein the detecting, determining, level 3 filtering, and reporting is performed after the UE is placed in a new reference signal received power mode.

9. The method of claim 4, wherein the detecting, determining, level 3 filtering, and reporting is not performed when the UE is in a legacy reference signal received power mode.

\* \* \* \* \*